US012469515B2

(12) United States Patent
Bi et al.

(10) Patent No.: US 12,469,515 B2
(45) Date of Patent: Nov. 11, 2025

(54) METHOD AND SYSTEM TO IMPROVE VOICE SEPARATION BY ELIMINATING OVERLAP

(71) Applicant: HARMAN INTERNATIONAL INDUSTRIES, INCORPORATED, Stamford, CT (US)

(72) Inventors: Xiangru Bi, Shanghai (CN); Zhilei Liu, Shanghai (CN); Guoxia Zhang, Shanghai (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/800,769

(22) PCT Filed: Feb. 21, 2020

(86) PCT No.: PCT/CN2020/076192

§ 371 (c)(1),
(2) Date: Aug. 18, 2022

(87) PCT Pub. No.: WO2021/164001

PCT Pub. Date: Aug. 26, 2021

(65) Prior Publication Data

US 2023/0088989 A1 Mar. 23, 2023

(51) Int. Cl.
*G10L 21/00* (2013.01)
*G10L 21/028* (2013.01)

(52) U.S. Cl.
CPC .................................. *G10L 21/028* (2013.01)

(58) Field of Classification Search
CPC ............... G10L 21/0272; G10L 21/028; G10L 21/0308; G10L 21/038; G10L 21/057;
(Continued)

(56) References Cited

U.S. PATENT DOCUMENTS 9,268,845 B1 * 2/2016 Sharifi .................... G06F 16/60
2003/0103561 A1 * 6/2003 Rickard .............. G06F 18/2134 375/232
(Continued)

FOREIGN PATENT DOCUMENTS

CN 102789783 A 11/2012
CN 105654963 A 6/2016
(Continued)

OTHER PUBLICATIONS

A. Jourjine, S. Rickard and O. Yilmaz, "Blind separation of disjoint orthogonal signals: demixing N sources from 2 mixtures," 2000 IEEE International Conference on Acoustics, Speech, and Signal Processing. Proceedings, Istanbul, Turkey, 2000, pp. 2985-2988 vol.5, doi: 10.1109/ICASSP.2000.861162. (Year: 2000).*
(Continued)

*Primary Examiner* — Michael Ortiz-Sanchez
(74) *Attorney, Agent, or Firm* — BROOKS KUSHMAN P.C.

(57) ABSTRACT

Aspects disclosed herein generally relate to a method and a system for improving voice separation by eliminating overlaps or overlapping points. The time-frequency points from the two recorded mixtures are separated by using a Degenerate unmixing estimation technique (DUET) algorithm. The method or system further eliminates the overlapping time-frequency points which belongs to neither of the original resources of sounds.

17 Claims, 3 Drawing Sheets

(58) Field of Classification Search
CPC .......... G10L 25/18; G10L 2021/02087; H04R 2225/43; H04R 1/1083; H04R 2460/01; H04S 2400/01; G06F 18/2134
See application file for complete search history.

(56) References Cited

U.S. PATENT DOCUMENTS

| | | | | |
|---|---|---|---|---|
| 2012/0020505 | A1 | 1/2012 | Yamada et al. | |
| 2012/0046940 | A1 | 2/2012 | Tsujikawa et al. | |
| 2014/0226838 | A1* | 8/2014 | Wingate | G10L 21/0272 381/111 |
| 2016/0099008 | A1* | 4/2016 | Barker | H04R 25/505 704/233 |
| 2016/0196343 | A1* | 7/2016 | Rafii | G06F 16/683 707/730 |
| 2019/0066713 | A1* | 2/2019 | Mesgarani | G10L 17/26 |
| 2019/0318754 | A1* | 10/2019 | Le Roux | G10L 19/02 |
| 2020/0322722 | A1* | 10/2020 | Chen | H04R 3/005 |

FOREIGN PATENT DOCUMENTS

| | | | | |
|---|---|---|---|---|
| CN | 110428852 | A | 11/2019 | |
| CN | 110491410 | A | 11/2019 | |
| CN | 110709929 | A | 1/2020 | |
| EP | 2437260 | A2 * | 4/2012 | G10H 1/0091 |
| WO | 2005101898 | A2 | 10/2005 | |
| WO | 2019061117 | A1 | 4/2019 | |
| WO | 2019100289 | A1 | 5/2019 | |

OTHER PUBLICATIONS

Stanković, Ljubiša, et al. "Compressive sensing based separation of nonstationary and stationary signals overlapping in time-frequency." IEEE Transactions on Signal Processing 61.18 (2013): 4562-4572. (Year: 2013).*

International Search Report dated Nov. 24, 2020 for PCT Appn. No. PCT/CN2020/076192 filed Feb. 21, 2020, 10 pgs.

Myung Jeon, K. et al., "Sparsity-based phase spectrum compensation for single-channel speech source separation", Digital Signal Processing, Dec. 2, 2019, 13 pgs.

First Chinese Office Action dated Jun. 25, 2024 for Chinese Application No. 202080097178.6 filed Aug. 19, 2022, 10 pgs.

European Search Report dated Jul. 21, 2023 for European Patent Application No. 20920448.6, 8 pages.

* cited by examiner

METHOD AND SYSTEM TO IMPROVE VOICE SEPARATION BY ELIMINATING OVERLAP

CROSS-REFERENCE TO RELATED APPLICATION

This application is the U.S. national phase of PCT Application No. PCT/CN2020/076192 filed on Feb. 21, 2020, the disclosure of which is incorporated in its entirety by reference herein.

TECHNICAL FIELD

The present invention relates generally to voice separation. More particularly, the present invention relates to a method for improving voice separation by eliminating overlaps. The present invention also relates to a system for improving voice separation by eliminating overlaps.

BACKGROUND

Nowadays, voice separation is widely used by general users in many occasions, one of which is, for example, in a car with speech recognition. When more than one person is speaking or while there is noise in the car, the host of the car cannot recognize the speech from the driver. Therefore, voice separation is needed to improve the speech recognition in this case. There are mainly two well-known types of voice separation methods. One is to create a microphone array to achieve voice enhancement. The other is to use the voice separation algorithms, such as, Frequency domain independent component analysis (FDICA), Degenerate unmixing estimation technique (DUET), or other extended algorithms. Because the FDICA algorithm for separating speech is more complex, the DUET algorithm is usually chosen for implementing the voice separation.

However, in the traditional DUET algorithm, some of time-frequency points overlapping may be separated into any of the voices. In this case, one of the separated voices may include another person's voice, which may result in the separated voice being not pure enough.

Therefore, there may be a need to partition these overlapping time-frequency points into a single cluster to avoid its appearing in the separated voice, so that the quality of the separated voice can be improved.

SUMMARY OF THE INVENTION

The present invention overcomes some of the drawbacks by providing a method and system to improve voice separation performance by eliminating overlaps.

On one hand, the present invention provides a method for improving voice separation performance by eliminating overlap. The method comprises the operations of: picking up, by at least two microphones, respectively, at least two mixtures including mixed first sound and second sound; recording and storing, in a sound recording module, the at least two mixtures from the at least two microphones; analyzing, in an algorithm module, the two mixtures to separate the time-frequency points. In particular, the algorithm module is configured to apply the Degenerate Unmixing Estimation Technique (DUET) algorithm, and the algorithm module further performs the operations of eliminating overlapping points from the time-frequency points. Thus, the first sound and the second sound are recovered into the time domain, respectively, from the time-frequency points with eliminating the overlapping points. The overlapping points comprise the time-frequency points that are neither of the first sound nor of the second sound. In this way, by using the method provided herein, the first sound is recovered from the time-frequency points only belonging to this first sound, and the second sound is recovered from the time-frequency points only belonging to this second sound, respectively.

In particular, in the method provided herein, eliminating the overlapping points comprises determining the overlapping points according to a rule of $|d1-d2|<d0/4$, where d1 is a distance between the overlapping point and a first peak center, d2 is a distance between the overlapping point and a second peak center, and d0 is the distance between the first peak center and the second peak center.

On the other hand, the present invention further provides a system for implementing the method to improve voice separation performance by eliminating overlap. The system comprises: at least two microphones for picking up at least two mixtures including mixed first sound and second sound; a sound recording module for recording and storing the at least two mixtures from the at least two microphones; an algorithm module configured to analyze the two mixtures to separate the time-frequency points. In particular, the algorithm module is configured to apply the Degenerate Unmixing Estimation Technique (DUET) algorithm, and the algorithm module further performs the operations of eliminating overlapping points from the time-frequency points. Thus, the first sound and the second sound are recovered into the time domain, respectively, from the time-frequency points only belonging to this first sound or to this second sound, respectively.

In particular, in the system provided herein, eliminating the overlapping points comprises determining the overlapping points according to a rule of $|d1-d2|<d0/4$, where d1 is a distance between the overlapping point and the first peak center, d2 is a distance between the overlapping point and a second peak center, and d0 is a distance between the first peak center and the second peak center.

BRIEF DESCRIPTION OF THE DRAWINGS

The present invention may be better understood from reading the following description of non-limiting embodiments, with reference to the attached drawings. In the figures, like reference numerals designates corresponding parts, wherein.

DETAILED DESCRIPTION OF THE INVENTION

The detailed description of the embodiments of the present invention is disclosed hereinafter; however, it is understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One of the objects of the invention is to provide a method to improve voice separation performance by eliminating overlap.

Figure 1:
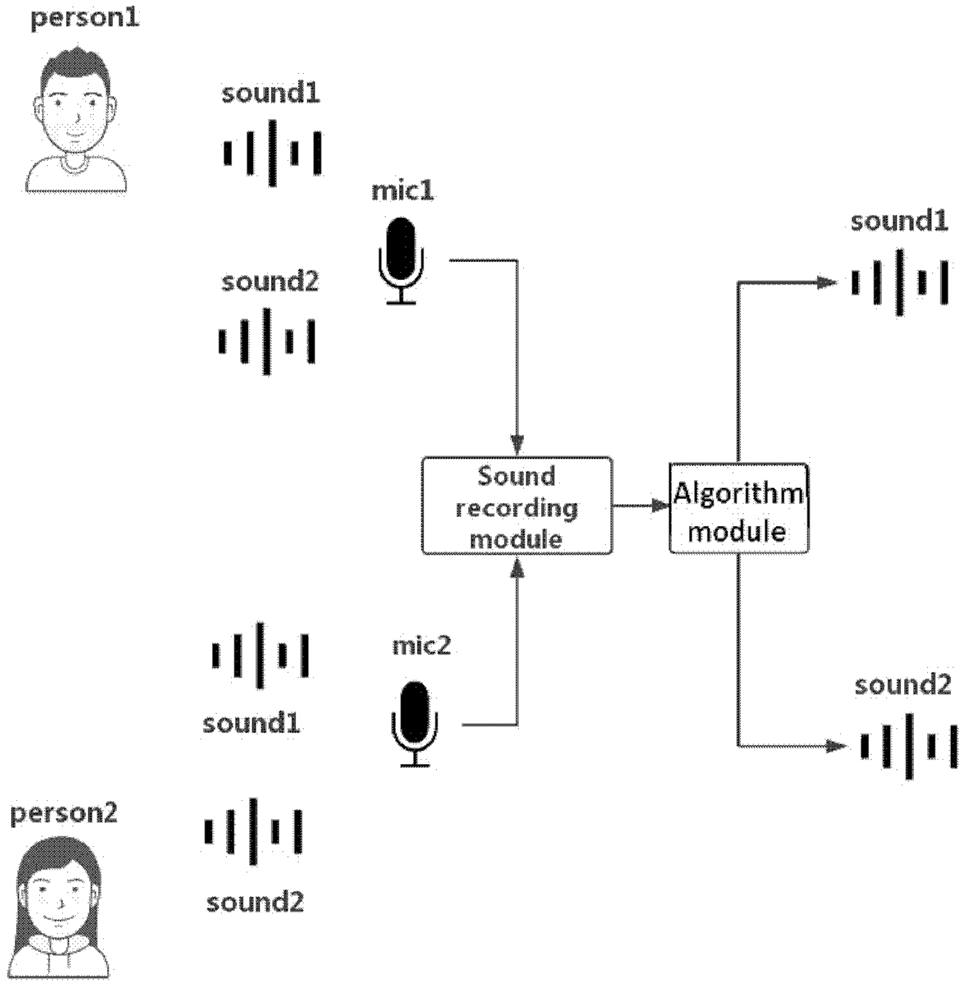
FIG. 1 is a schematic diagram illustrating a system to improve voice separation according to one embodiment of the invention.

In one embodiment, FIG. 1 illustrates a system diagram of voice separation. As an example, there are two microphones (mic 1, mic 2) are opened at the same time and the two microphones (mic 1, mic 2) are recording, then two persons (person 1, person 2) start talking. As shown in FIG. 1, the sound 1 belongs to the person 1 and the sound 2 belongs to the person 2. However, in this case, each of the two microphones (mic1, mic2) picks up mixtures including both of the sound 1 and the sound 2. The sound recording module shown in FIG. 1 is responsible for recording and storing the mixed voice incoming from the two microphones (mic1, mic2). The algorithm module analyses the mixtures recorded and stored in the sound recording module and eliminates overlaps from them, and finally, we can get the separated sound 1 and the separated sound 2 from the mixed voice, respectively.

Figure 2:
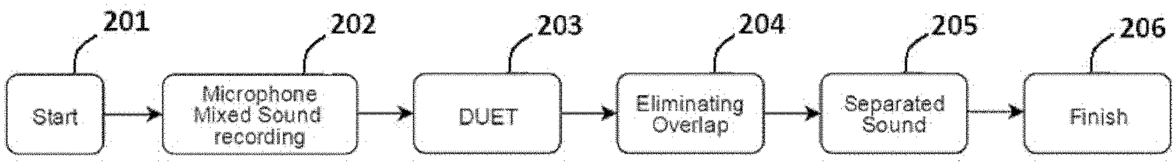
FIG. 2 is a flow chart illustrating a method to improve voice separation according to one embodiment of the invention.

FIG. 2 shows a flow chart illustrating a method provided herein to improve voice separation according to an embodiment of the invention. The method is started from operation 201. In operation 201, as the description referring to FIG. 1, two microphones (mic 1, mic 2), for example, are picking up the mixed two sounds (sound 1, sound 2) from the two persons (person 1, person 2).

In operation 202, the mixed sounds picked up by the two microphones (mic1, mic2) are recorded and stored in the sound recording module.

Next, the algorithm module performs the analysis to the mixtures recorded and stored in the operation 203. In the algorithm module, the DUET is proposed as the algorithm for speech separation in the embodiment. The DUET algorithm is one of the methods of blind signal separation (BSS) which is to retrieve source signals from mixtures of them without a priori information about the source signals and the mixing process.

The DUET Blind Source Separation method is valid when the sources are W-disjoint orthogonal, that is, when the supports of the windowed Fourier transform of the signals in the mixture are disjointed. This DUET algorithm can roughly separate any number of sources using only two mixtures. For anechoic mixtures of attenuated and delayed sources, the DUET algorithm allows one to estimate the mixing parameters by clustering relative attenuation-delay pairs extracted from the ratios of the time-frequency representations of the mixtures. The estimates of the mixing parameters are then used to partition the time-frequency representation of one mixture to recover the original sources.

The DUET voice separation algorithm is divided into the following operations:

Construct a time-frequency representations $\hat{x}_1(\tau,\omega)$ and $\hat{x}_2(\tau,\omega)$ from mixtures $x_1(t)$ and $x_2(t)$, wherein $x_1(t)$ and $x_2(t)$ are the mixed voice signals.

Calculate relative attenuation-delay pairs:

$$\left(\left[\frac{\hat{x}_2(\tau,\omega)}{\hat{x}_1(\tau,\omega)}\right]-\left[\frac{\hat{x}_1(\tau,\omega)}{\hat{x}_2(\tau,\omega)}\right],\ \frac{-1}{\omega}L\left(\frac{\hat{x}_2(\tau,\omega)}{\hat{x}_1(\tau,\omega)}\right)\right) \tag{1}$$

Figure 3:
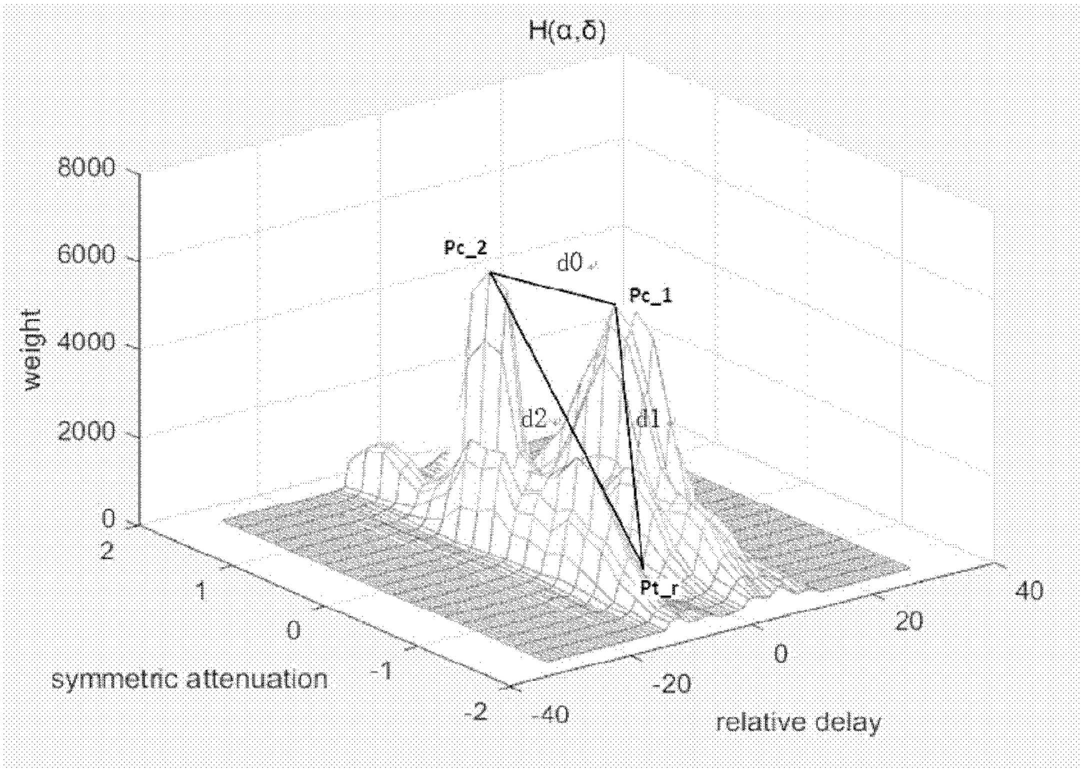
FIG. 3 is a schematic diagram illustrating a smoothed weighted histogram of the DUET algorithm according to one embodiment of the invention.

Construct 2D smoothed weighted histogram $H(\alpha,\delta)$. The histogram of both direction-of-arrivals (DOAs) and distances are formed from the mixtures which are observed using two microphones. And then, the signal separation can be achieved using time-frequency masking based on the histogram. An example of the histogram is shown in FIG. 3.

The histogram is built as follows:

$$H(\alpha,\delta):=\iint_{(\tau,\omega)\in I(\alpha,\delta)}|\hat{x}_1(\tau,\omega)\hat{x}_2(\tau,\omega)|^p\omega^q d\tau d\omega \tag{2}$$

where, the X-axis is $$\frac{-1}{\omega}L\left(\frac{\hat{x}_2(\tau,\omega)}{\hat{x}_1(\tau,\omega)}\right),$$

which corresponds to the relative delay;

the Y-axis is $$\left[\frac{\hat{x}_2(\tau,\omega)}{\hat{x}_1(\tau,\omega)}\right]-\left[\frac{\hat{x}_1(\tau,\omega)}{\hat{x}_2(\tau,\omega)}\right],$$

which indicates the symmetric attenuation, and the Z-axis is $H(\alpha,\delta)$, which represents the weight.

Locate peaks and peak centers (Pc_1, Pc_2) in the histogram, which determine the mixing parameter estimates. As an example, we use k-means clustering algorithm to approximate points in the histogram.

Construct time-frequency binary masks for each peak center $(\tilde{\alpha}_j,\tilde{\delta}_j$ as follow:

$$\tilde{M}_j(\tau,\omega):=\begin{cases}1 & J(\tau,\omega)=j\\ 0 & \text{otherwise}\end{cases} \tag{3}$$

and apply each of the masks to the appropriately aligned mixtures, respectively, as follow:

$$\tilde{\hat{s}}_j(\tau,\omega)=\tilde{M}_j(\tau,\omega)\left(\frac{\hat{x}_1(\tau,\omega)+\tilde{a}_j e^{i\tilde{\delta}_i\omega}\hat{x}_2(\tau,\omega)}{1+\tilde{a}_j^2}\right) \tag{4}$$

As can be seen from the histogram as shown in FIG. 3, in the embodiment, the application process is performed twice relative to each of the two peak centers (Pc_1, Pc_2), respectively.

By far each estimated source time-frequency representation has been partitioned into each one of the two peak centers (Pc_1, Pc_2), which may be converted back into the time domain to get the separated sound 1 and sound 2.

However, the recorded source mixtures are usually not W-disjoint orthogonal. In the embodiment, suppose there are, for example, only two people talking at the same time. Due according to the rule of the time-frequency binary masks construction $$\tilde{M}_j(\tau,\omega):=\begin{cases}1 & J(\tau,\omega)=j\\ 0 & \text{otherwise}\end{cases}$$

in the DUET algorithm, the time-frequency points are divided into two parts by non-zero or one. In case that some of the time-frequency points between the two peaks are not W-disjoint orthogonal and these time-frequency points mix the voices from the two persons (person 1, person 2). In the disclosed embodiment, these time-frequency points are defined as the overlapping points. In this case, because of existing these overlapping time-frequency points, one of the separated voices may include another person's voice, which entails that the separated sound 1 may also include the sound 2, and results in the separated voice being not pure enough. In fact, the overlapping time-frequency points of mixed two-person voices do not belong to anyone of the persons. The overlapping points should be categorized into the third category to be eliminated.

To solve the above technical problem, aspects disclosed herein provide, among other things, a method to improve the voice separation performance by eliminating the overlap, in which the overlapping time-frequency points are found out and divided into a single cluster, and they do not appear in the separated voice. Therefore, the quality of separated voice can be improved.

In particular, as shown in the operation 204 of FIG. 2, one way to find out these overlapping time-frequency points is provided as an example. Referring to FIG. 3, the disclosed embodiment calculates a first distance d1 between a time-frequency point Pt_r and a first peak center Pc_1, then calculate a second distance d2 between the time-frequency point Pt_r and a second peak center Pc_2, and finally calculate a distance d0 between the first peak center Pc_1 and the second peak center Pc_2, i.e., calculating $|d1-d2|$, when $|d1-d2|$ is less than a threshold, the time-frequency point Pt_r can be determined as an overlapping point. That is to say, an overlapping point can be determined when the differential value between the first distance d1 and the second distance d2 is less than the threshold. In the embodiment, the threshold can be set as a quarter of the distance d0 between the two peak centers (Pc_1, Pc_2). In other words, when time-frequency points meet this requirement:

$$|d1 - d2| < \frac{d0}{4} \tag{5}$$

it can be determined that the time-frequency point (Pt_r) does not belong to any of the two peaks in FIG. 3 and can be identified as an overlapping time-frequency point. These overlapping time-frequency representations do not convert back into the time domain. The overlapping points can be found by traversing all the time-frequency points as shown in FIG. 3.

Finally, in operation 205 of FIG. 2, the overlapping points selected from the time-frequency points are eliminated, and the rest time-frequency points separated into each one of two persons are converted into the time domain to recover the original sources with separately sound 1 and sound 2. The method is finished at operation 206.

Other objects of the disclosed embodiments provide a system for improving voice separation performance by eliminating overlaps.

In the embodiment as shown in FIG. 1, the system for improving voice separation comprises two microphones (mic 1, mic 2) which are turned on at the same time and are recording the voice signal mixed from two persons (person 1, person 2). Referring to FIG. 1, the sound 1 belongs to the person 1 and the sound 2 belongs to the person 2. However, in this case of FIG. 1, each of the two microphones (mic1, mic2) picks up mixtures including both of the sound 1 and the sound 2. The sound recording module shown in FIG. 1 is responsible for recording and storing the mixed voice incoming from the two microphones (mic1, mic2). In order to get the separated sound 1 and sound 2 from the mixed voice, respectively, the system further includes an algorithm module, which analyses the mixtures recorded and stored in the sound recording module using the DUET algorithm and eliminates overlaps from them, and finally, we can get the separated sound 1 and the separated sound 2 from the mixed voice, respectively.

As described above, the method and system provided herein elimination overlaps that exist in the separated voice signals and thus improves the quality of the voice separation. Those skilled in the art can understand that the signals picked up by the microphones in the present invention are not limited to two and can be extended to any number of mixed signals. The algorithm processed in the method and system herein can be performed, iteratively.

As used in this application, an element or operation recited in the singular and proceeded with the word "a" or "an" should be understood as not excluding plural of the elements or operations, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimd is:

1. A method for performing voice separation by eliminating overlaps between at least two sounds, the method comprising:

picking up, by at least two microphones, respectively, at least two mixtures including a first sound and a second sound;

recording and storing, in a sound recording module, the at least two mixtures from the at least two microphones;

analyzing, in an algorithm module, the at least two mixtures for recovering the first sound and the second sound, respectively, wherein the algorithm module further comprises:

discarding overlapping points from time-frequency points; and;

separating the time-frequency points from the discarded overlapping points discarded in relation to the first sound and the second sound, respectively; and wherein the overlapping points are found among the time-frequency points, and each of the overlapping points is determined when a differential value between a first distance and a second distance is less than a threshold, wherein the first distance is a distance from one of the time-frequency points to be determined to a first peak center, and the second distance is a distance from a same time-frequency point to be determined to a second peak center.

2. The method of claim 1, wherein the overlapping points comprise the time-frequency points that are neither of the first sound nor of the second sound.

3. The method of claim 2, wherein the overlapping points that comprise the time-frequency points are partitioned into a single cluster.

4. The method of claim 1, wherein the threshold is set to a quarter of the distance between the first peak center and the second peak center.

5. The method of claim 2, wherein the overlapping points are determined by traversing all of the time-frequency points in relation to the first sound and the second sound, respectively.

6. The method of claim 1, wherein analyzing the at least two mixtures comprises performing a Degenerate Unmixing Estimation Technique (DUET) algorithm.

7. The method of claim 1, wherein recovering the first sound and the second sound comprises converting the time-frequency points with the overlapping points that were previously discarded back to a time domain.

8. The method of claim 1, wherein the method can be implemented in any occasions with more than one person talking at the same time.

9. A system for performing voice separation by eliminating overlaps between at least two sounds, comprising:

at least two microphones adapted to pick up at least two mixtures including a first sound and a second sound, respectively;

a processing including:

a sound recording module adapted to record and store said at least two mixtures from the at least two microphones;

an algorithm module adapted to analyze the at least two mixtures for recovering the first sound and the second sound, respectively, wherein the algorithm module is further configured to:

discard overlapping points from time-frequency points; and;

separate the time-frequency points from the discarded overlapping points relative to the first sound and the second sound, respectively; and wherein the overlapping points are found among the time-frequency points, and each of the overlapping points is determined in response to a differential value between a first distance and a second distance being less than a threshold, wherein the first distance is a distance from one of the time-frequency points to be determined to a first peak center, and the second distance is a distance from a same time-frequency point to be determined to a second peak center.

10. The system of claim 9, wherein the overlapping points comprise the time-frequency points that are neither of the first sound nor of the second sound.

11. The system of claim 10, wherein the threshold is set to a quarter of the distance between the first peak center and the second peak center.

12. The system of claim 10, wherein the overlapping points are found by traversing all the time-frequency points in relation to the first sound and the second sound, respectively.

13. The system of claim 9, wherein the algorithm module for analyzing said at least two mixtures performs a Degenerate Unmixing Estimation Technique (DUET) algorithm.

14. The system of claim 9, wherein the first sound and the second sound are recovered by converting the time-frequency points with the discarded overlapping points back to a time domain.

15. A non-transitory computer-readable storage medium including instructions that, when executed by a processor, performs voice separation by eliminating overlaps between at least two sounds, the computer-readable storage medium comprising instructions for:

picking up, by at least two microphones, respectively, at least two mixtures including a first sound and a second sound;

recording and storing, in a sound recording module, the at least two mixtures from the at least two microphones;

analyzing the at least two mixtures for recovering the first sound and the second sound, respectively, discarding overlapping points from time-frequency points; and separating the time-frequency points from the discarded overlapping points relative to the first sound and the second sound, respectively, wherein the overlapping points are found among the time-frequency points, and each of the overlapping points is determined when a differential value between a first distance and a second distance is less than a threshold, wherein the first distance is a distance from one of the time-frequency points to be determined to a first peak center, and the second distance is a distance from a same time-frequency point to be determined to a second peak center.

16. The computer-readable storage medium of claim 15, wherein the overlapping points comprise the time-frequency points that are neither of the first sound nor of the second sound.

17. The computer-readable storage medium of claim 16, wherein the threshold is set to a quarter of the distance between the first peak center and the second peak center.

* * * * *